United States Patent
Bahceci (10) Patent No.: US 12,308,965 B2
(45) Date of Patent: May 20, 2025

(54) CODEBOOK BASED ZERO-FORCED MU-MIMO BEAMFORMING

(71) Applicant: Telefonaktiebolaget LM Ericsson (publ), Stockholm (SE)

(72) Inventor: Israfil Bahceci, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 346 days.

(21) Appl. No.: 17/910,872

(22) PCT Filed: Apr. 7, 2020

(86) PCT No.: PCT/IB2020/053328
§ 371 (c)(1),
(2) Date: Sep. 12, 2022

(87) PCT Pub. No.: WO2021/205206
PCT Pub. Date: Oct. 14, 2021

(65) Prior Publication Data
US 2023/0119746 A1  Apr. 20, 2023

(51) Int. Cl.
*H04L 1/06* (2006.01)
*H04B 7/0452* (2017.01)
*H04B 7/06* (2006.01)

(52) U.S. Cl.
CPC ......... *H04L 1/0693* (2013.01); *H04B 7/0452* (2013.01); *H04B 7/0639* (2013.01); *H04B 7/0658* (2013.01)

(58) Field of Classification Search
CPC ... H04L 1/0693; H04B 7/0452; H04B 7/0639; H04B 7/0658
(Continued)

(56) References Cited

U.S. PATENT DOCUMENTS

| | | | | |
|---|---|---|---|---|
| 2012/0020243 | A1* | 1/2012 | Gong | H04B 7/0452 370/254 |
| 2013/0315189 | A1* | 11/2013 | Kim | H04L 1/0026 370/328 |

(Continued)

FOREIGN PATENT DOCUMENTS

WO  2019/122972 A1  6/2019

OTHER PUBLICATIONS

International Search Report and Written Opinion dated Nov. 24, 2020 issued in PCT Application No. P079849US01, consisting of 13 pages.

*Primary Examiner* — Christopher M Crutchfield
*Assistant Examiner* — Jean F Voltaire
(74) *Attorney, Agent, or Firm* — Weisberg I.P. Law, P.A.

(57) ABSTRACT

A network node configured to communicate with a plurality of wireless devices is provided. The network node includes processing circuitry configured to: receive partial Channel State Information, CSI, from each of the plurality of wireless devices; determine a first plurality of precoders based at least in part on the partial CSI received from each of the plurality of wireless devices where each precoder of the first plurality of precoders is associated with a respective one of the plurality of wireless devices; determine a second plurality of precoders based at least in part on the first plurality of precoders; and optionally cause multiple-user multiple-input multiple-output, MU-MIMO, transmission to the plurality of wireless devices based at least in part on the plurality of second precoders.

18 Claims, 4 Drawing Sheets

(58) Field of Classification Search
USPC .......................................................... 370/329
See application file for complete search history.

(56) References Cited

U.S. PATENT DOCUMENTS

2019/0140730 A1\*   5/2019   Oteri .................... H04B 7/0695
2021/0194546 A1\*   6/2021   Qiang ................... H04B 7/0478
2022/0131581 A1\*   4/2022   Jeon .................... H04B 7/0486

\* cited by examiner

CODEBOOK BASED ZERO-FORCED MU-MIMO BEAMFORMING

CROSS-REFERENCE TO RELATED APPLICATIONS

This application is a Submission Under 35 U.S.C. § 371 for U.S. National Stage Patent Application of International Application Number: PCT/IB2020/053328 filed Apr. 7, 2020 entitled "CODEBOOK BASED ZERO-FORCED MU-MIMO BEAMFORMING," the entirety of which is incorporated herein by reference.

TECHNICAL FIELD

Wireless communication and, in particular, multiuser (MU)-Multiple-Input Multiple Output (MIMO) transmission using based at least in part on minimal and/or partial channels state information.

BACKGROUND

Massive multi-antenna systems help enable a high channel capacity, but the capacity of a single link may be limited by the quantity of receive antenna elements. In order to benefit from the massive number of antenna elements at the network node, multiple wireless devices may need to be paired, and suitable beamformers may need to be determined, such that inter-wireless device interferences are reduced. To help determine such pairing and suitable beamformers, accurate and complete channel state information (e.g., complex channel gains between all transmit and receive antenna elements) may need to be obtained and Zero-Forcing precoding may need to be employed to cancel out inter-layer interference. However, obtaining accurate complete channel state information may require significant overhead, and/or may be cumbersome due to inaccuracies of downlink (DL)/uplink (UL) radio frequency (RF) paths that may require accurate calibration.

Further, for Type-1 or Type-2 codebook in Third Generation Partnership Project (3GPP) Release 15 and above (Rel 15+), single-user (SU) Multiple-Input Multiple-Output (MIMO) transmissions can be performed resulting in good performance. However, the complete channel state information available from SU-MIMO feedback may not be directly usable for multi-user (MU)-MIMO transmission. For example, if the precoder from such feedback, i.e., from SU MIMO, is used in existing systems with MU-MIMO transmission, significant inter-wireless device interference may be created that can significantly reduce the expected throughput. Uplink channel measurements could be used for determining downlink precoders, however, such reciprocity based MU-MIMO is prone to uplink/downlink radio frequency (RF) path inaccuracies. For example, in frequency duplex systems, it is difficult to predict accurate channel state of one communication direction (DL) from the other one (UL).

Further, providing the complete channel state information creates significant overhead. The MU-MIMO gains from such feedback becomes available at the expense of uplink channel overhead. In some cases, uplink capacity may not be enough to provide such accurate complete channel state information (CSI), i.e., CSI estimates. In other words, while complete channel state information for SU-MIMO may produce good performance in SU-MIMO transmission, using such information for MU-MIMO may be problematic. Also, while complete channel state information for MU-MIMO may produce good performed for MU-MIMO transmission, such information may be difficult to accurately determine at the wireless device and/or disadvantageously may require significant uplink overhead.

SUMMARY

Some embodiments advantageously provide a method and system for MU-MIMO transmission based at least in part on minimal and/or partial channels state information.

In one or more embodiments, precoder feedback information from each wireless device is used to create new or modified precoders such that the resulting transmission (e.g., MU-MIMO transmission) takes place in certain directions for each wireless device while minimizing the interference to other wireless devices in the MU-MIMO group. In one or more embodiments, precoder feedback information from a wireless device may correspond to SU-MIMO CSI feedback from the wireless device which may correspond to partial MU-MIMO CSI feedback from the wireless device. Since MU-MIMO creates simultaneous transmissions to multiple wireless devices, the precoder feedback from a single wireless device may correspond to "full" CSI feedback for SU-MIMO transmissions, and "partial" CSI feedback for MU-MIMO transmissions.

In one or more embodiments, any codebook-based channel state feedback may be used to calculate the required precoders for MU-MIMO transmission. Since codebook based CSI feedbacks have low overhead, only a small uplink overhead is needed where small may be quantified with respect to uplink overhead required for complete CSI (e.g., complex channel gains between all transmit and receive antenna elements).

Since wireless device feedbacks provide a preliminary precoder for each wireless device with the required dimensions, the network node may operate only on lower dimensional precoder matrices instead of full channel matrices, which may be associated with complete channel state information, whose dimensions may be very large and may prevent computationally heavy/demanding channel inversion techniques such as Zero-Forcing or regularized zero-forcing precoders.

According to one aspect of the disclosure, a network node configured to communicate with a plurality of wireless devices is provided. The network node includes processing circuitry configured to: receive partial Channel State Information, CSI, from each of the plurality of wireless devices; determine a first plurality of precoders based at least in part on the partial CSI received from each of the plurality of wireless devices where each precoder of the first plurality of precoders is associated with a respective one of the plurality of wireless devices; determine a second plurality of precoders based at least in part on the first plurality of precoders; and optionally cause multiple-user multiple-input multiple-output, MU-MIMO, transmission to the plurality of wireless devices based at least in part on the plurality of second precoders. According to one or more embodiments of this aspect, the partial CSI corresponds to complex precoding information. According to one or more embodiments of this aspect, the partial CSI corresponds to a precoding matrix indicator, PMI.

According to one or more embodiments of this aspect, the partial CSI corresponds to full CSI feedback for Single-User MIMO and partial CSI feedback for MU-MIMO. According to one or more embodiments of this aspect, the second plurality of precoders are configured to generate more nulls in the MU-MIMO transmission when compared to using the first plurality of precoders for MU-MIMO transmission. According to one or more embodiments of this aspect, the first plurality of precoders correspond to SU-MIMO precoders. According to one or more embodiments of this aspect, the determining of the second plurality of precoders for MU-MIMO transmission to the plurality of wireless devices includes modifying each of the first plurality of precoders with weighting matrices.

According to one or more embodiments of this aspect, the processing circuitry is further configured to at least one of: perform a first rank reduction on the first plurality of precoders; perform a second rank reduction on the second plurality of precoders; and the MU-MIMO transmission being based at least in part on at least one of the first rank reduction and second rank reduction. According to one or more embodiments of this aspect, the second plurality of precoders are configured to generate less interference in the MU-MIMO transmission when compared to using the first plurality of precoders for MU-MIMO transmission. According to one or more embodiments of this aspect, the second plurality of precoders are configured to reduce MU-MIMO transmission leakage to the plurality of wireless devices when compared to using the first plurality of precoders for MU-MIMO transmission.

According to another aspect of the disclosure, a method implemented by a network node that is configured to communicate with a plurality of wireless devices is provided. Partial Channel State Information, CSI, is received from each of the plurality of wireless devices. A first plurality of precoders are determined based at least in part on the partial CSI received from each of the plurality of wireless device where each precoder of the first plurality of precoders is associated with a respective one of the plurality of wireless devices. A second plurality of precoders is determined based at least in part on the first plurality of precoders. Multiple-user multiple-input multiple-output, MU-MIMO, transmission to the plurality of wireless devices is optionally caused based at least in part on the plurality of second precoders.

According to one or more embodiments of this aspect, the partial CSI corresponds to complex precoding information. According to one or more embodiments of this aspect, the partial CSI corresponds to a precoding matrix indicator, PMI. According to one or more embodiments of this aspect, other portions of CSI not included in the partial CSI are not used to determine the first plurality of precoders. According to one or more embodiments of this aspect, the second plurality of precoders are configured to generate more nulls in the MU-MIMO transmission when compared to using the first plurality of precoders for MU-MIMO transmission.

According to one or more embodiments of this aspect, the first plurality of precoders correspond to SU-MIMO precoders. According to one or more embodiments of this aspect, the determining of the second plurality of precoders for MU-MIMO transmission to the plurality of wireless devices includes modifying each of the first plurality of precoders with weighting matrices. According to one or more embodiments of this aspect, at least one of: performing a first rank reduction on the first plurality of precoders; performing a second rank reduction on the second plurality of precoders; and the MU-MIMO transmission being based at least in part on at least one of the first rank reduction and second rank reduction. According to one or more embodiments of this aspect, the second plurality of precoders are configured to generate less interference in the MU-MIMO transmission when compared to using the first plurality of precoders for MU-MIMO transmission. According to one or more embodiments of this aspect, the second plurality of precoders are configured to reduce MU-MIMO transmission leakage to the plurality of wireless devices when compared to using the first plurality of precoders for MU-MIMO transmission.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Before describing in detail exemplary embodiments, it is noted that the embodiments reside primarily in combinations of apparatus components and processing steps related to MU-MIMO transmission based at least in part on minimal and/or partial channels state information.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

A cell may be generally a communication cell, e.g., of a cellular or mobile communication network, provided by a node. A serving cell may be a cell on or via which a network node (the node providing or associated to the cell, e.g., base station, gNB or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode and/or to provide partial CSI (also referred to as partial CSI feedback). A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

In one or more embodiments, since MU-MIMO creates simultaneous transmissions to multiple wireless devices, the precoder feedback from a single wireless device may correspond to "full" CSI feedback for SU-MIMO transmissions, and "partial" CSI feedback for MU-MIMO transmissions. For example, as used herein in one or more embodiments, "full CSI" (also referred to as full CSI feedback) may correspond to complete information suitable for SU-MIMO transmission and may refer to any form of precoder feedback intended for SU-MIMO transmission for the associated wireless device. For example, as used herein in one or more embodiments, "partial CSI" (also referred to as partial CSI feedback) may correspond part of the information that will be combined with other precoder feedbacks from different wireless devices to obtain a composite precoder matrix containing per wireless device "full CSI feedback" (with respect to SU-MIMO) information suitable for MU-MIMO precoder calculation/determination.

In one or more embodiments, "full CSI" and "partial CSI" may refer to the same content but the content becomes "full" information if intended and/or used for SU-MIMO, and/or becomes "partial" information if used for MU-MIMO transmission.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide MU-MIMO transmission based at least in part on minimal and/or partial channel state information.

Figure 1:
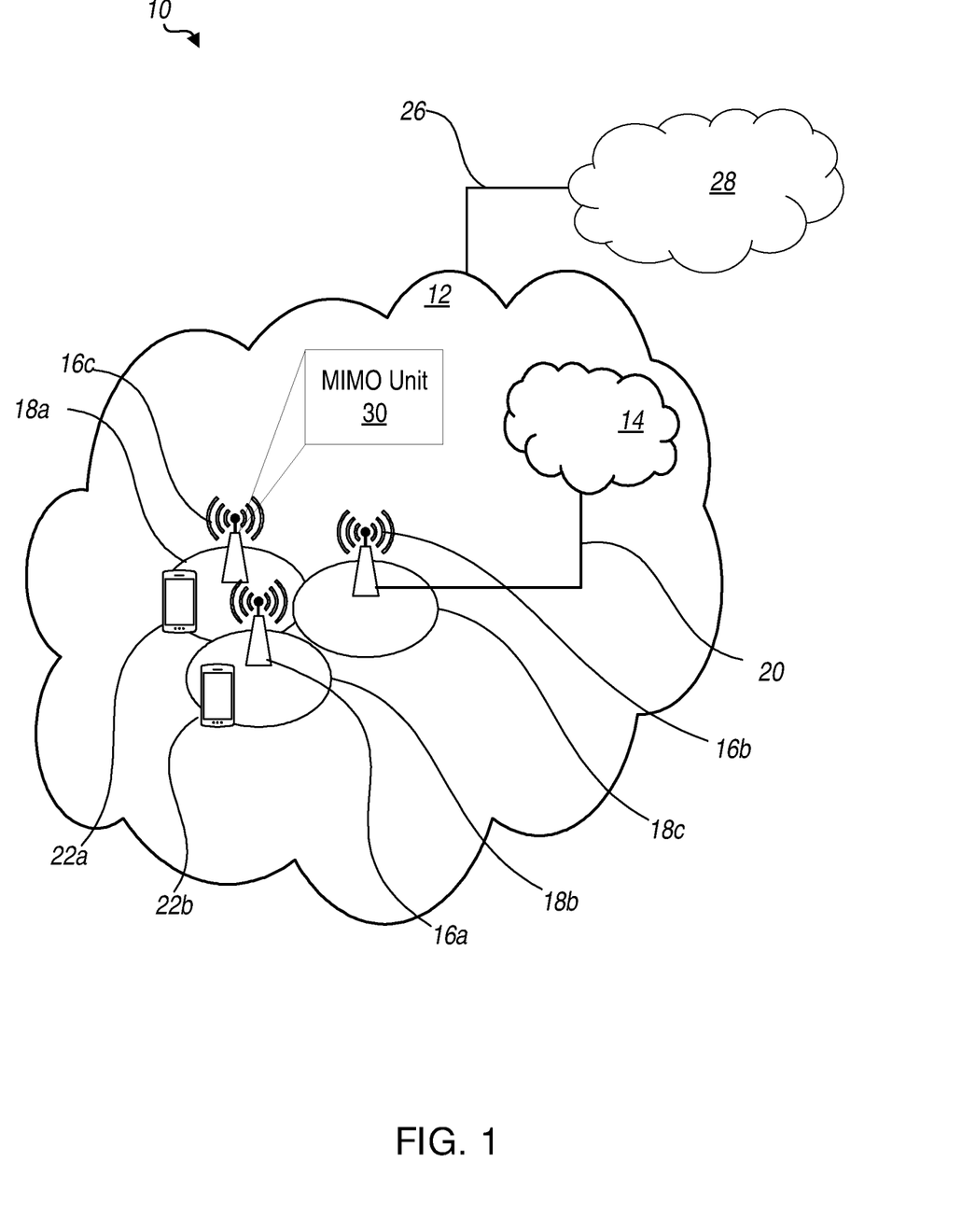
FIG. 1 is a schematic diagram of an exemplary network architecture illustrating a communication system according to the principles in the present disclosure.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include a MIMO unit 30 which is configured to perform one or more network node 16 functions as described herein such as with respect to MU-MIMO transmission based at least in part on minimal channel state information where minimal channel state information may corresponds to partial channel state information where the partial channel state information is merged to create a precoder for MU-MIMO as described herein. For example, in one or more embodiments, the partial channel state information may correspond to at least one of complex precoding information such as pre-coding matrix indicator (PMI), location information for the wireless device 22 and compressed CSI feedback that may corresponds to information other than complete CSI that may contain complex channel gains among all antenna elements.

Example implementations, in accordance with an embodiment, of the WD 22 and network node 16 discussed in the preceding paragraphs will now be described with reference to FIG. 2.

The communication system 10 includes a network node 16 provided in a communication system 10 and including hardware 32 enabling it to communicate with the WD 22. The hardware 32 may include a communication interface 34 for setting up and maintaining a wired or wireless connection with an interface of a different communication device of the communication system 10, as well as a radio interface 36 for setting up and maintaining at least a wireless connection 37 with a WD 22 located in a coverage area 18 served by the network node 16. The radio interface 36 may be formed as or may include, for example, one or more RF transmitters, one or more RF receivers, and/or one or more RF transceivers. The communication interface 34 may be configured to facilitate a connection to one or more other network nodes 16.

In the embodiment shown, the hardware 32 of the network node 16 further includes processing circuitry 38. The processing circuitry 38 may include a processor 40 and a memory 42. In particular, in addition to or instead of a processor, such as a central processing unit, and memory, the processing circuitry 38 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 40 may be configured to access (e.g., write to and/or read from) the memory 42, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 42, or stored in external memory (e.g., database, storage array, network storage device, etc.) accessible by the network node 16 via an external connection. The software 44 may be executable by the processing circuitry 38. The processing circuitry 38 may be configured to control any of the methods and/or processes described herein and/or to cause such methods, and/or processes to be performed, e.g., by network node 16. Processor 40 corresponds to one or more processors 40 for performing network node 16 functions described herein. The memory 42 is configured to store data, programmatic software code and/or other information described herein. In some embodiments, the software 44 may include instructions that, when executed by the processor 40 and/or processing circuitry 38, causes the processor 40 and/or processing circuitry 38 to perform the processes described herein with respect to network node 16. For example, processing circuitry 38 of the network node 16 may include MIMO unit 30 configured to perform one or more network node 16 functions as described herein such as with respect to MU-MIMO transmission based at least in part on minimal and/or partial channels state information.

The communication system 10 further includes the WD 22 already referred to. The WD 22 may have hardware 46 that may include a radio interface 48 configured to set up and maintain a wireless connection 37 with a network node 16 serving a coverage area 18 in which the WD 22 is currently located. The radio interface 48 may be formed as or may include, for example, one or more RF transmitters, one or more RF receivers, and/or one or more RF transceivers.

The hardware 46 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22. The client application 58 may interact with the user to generate the user data that it provides.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22. For example, processing circuitry 50 may be configured to provide partial CSI to network node 16 and to received MU-MIMO transmission from the network node 16, both of which are known in the art.

Figure 2:
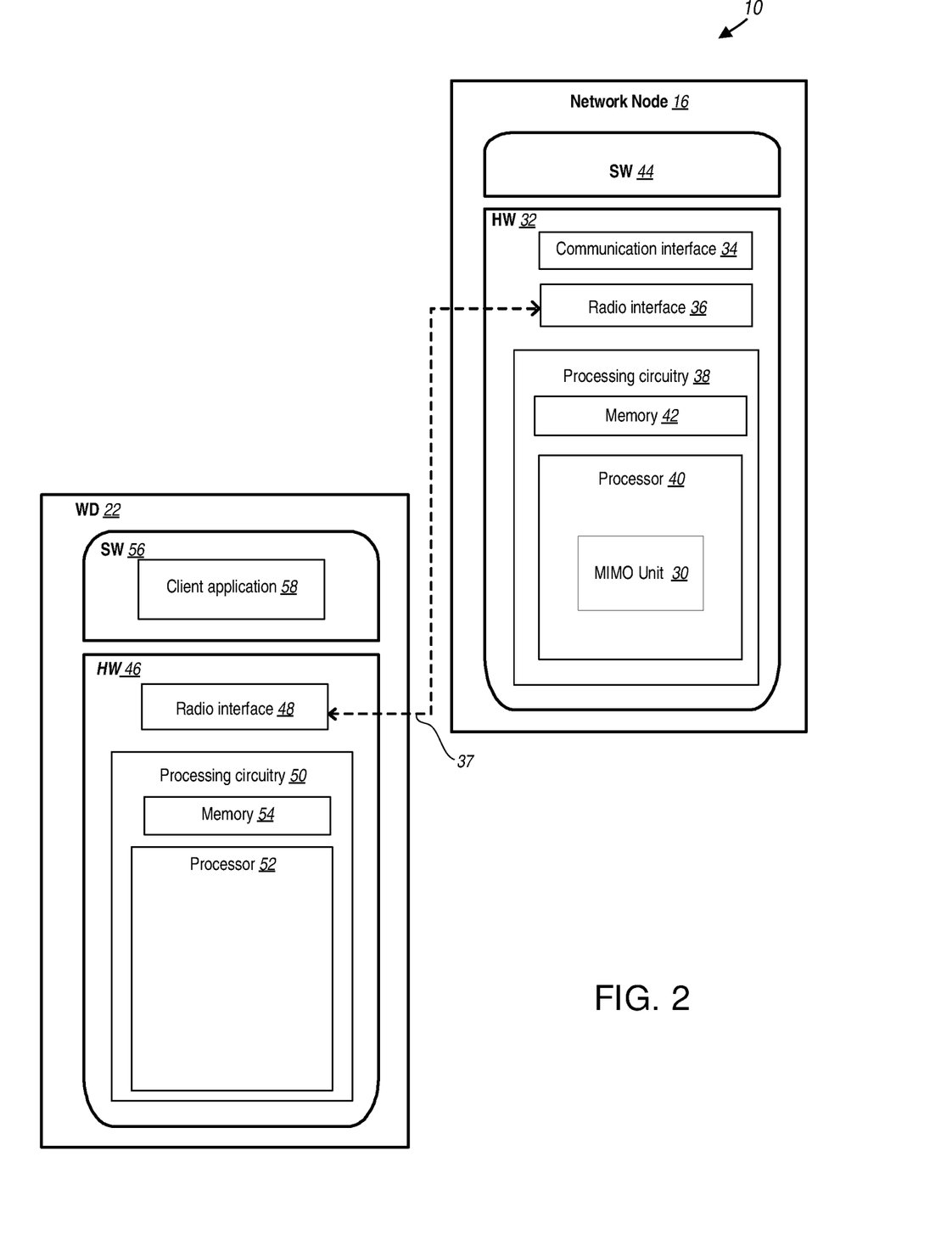
FIG. 2 is a block diagram of a portion of the communication system where the network node communicates with a wireless device according to some embodiments of the present disclosure.

In some embodiments, the inner workings of the network node 16 and WD 22 may be as shown in FIG. 2 and independently, the surrounding network topology may be that of FIG. 1.

The wireless connection 37 between the WD 22 and the network node 16 is in accordance with the teachings of the embodiments described throughout this disclosure. The teachings of some of these embodiments may improve the data rate, latency, and/or power consumption and thereby provide benefits such as reduced user waiting time, relaxed restriction on file size, better responsiveness, extended battery lifetime, etc.

Although FIGS. 1 and 2 show "unit" such as MIMO unit 30 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
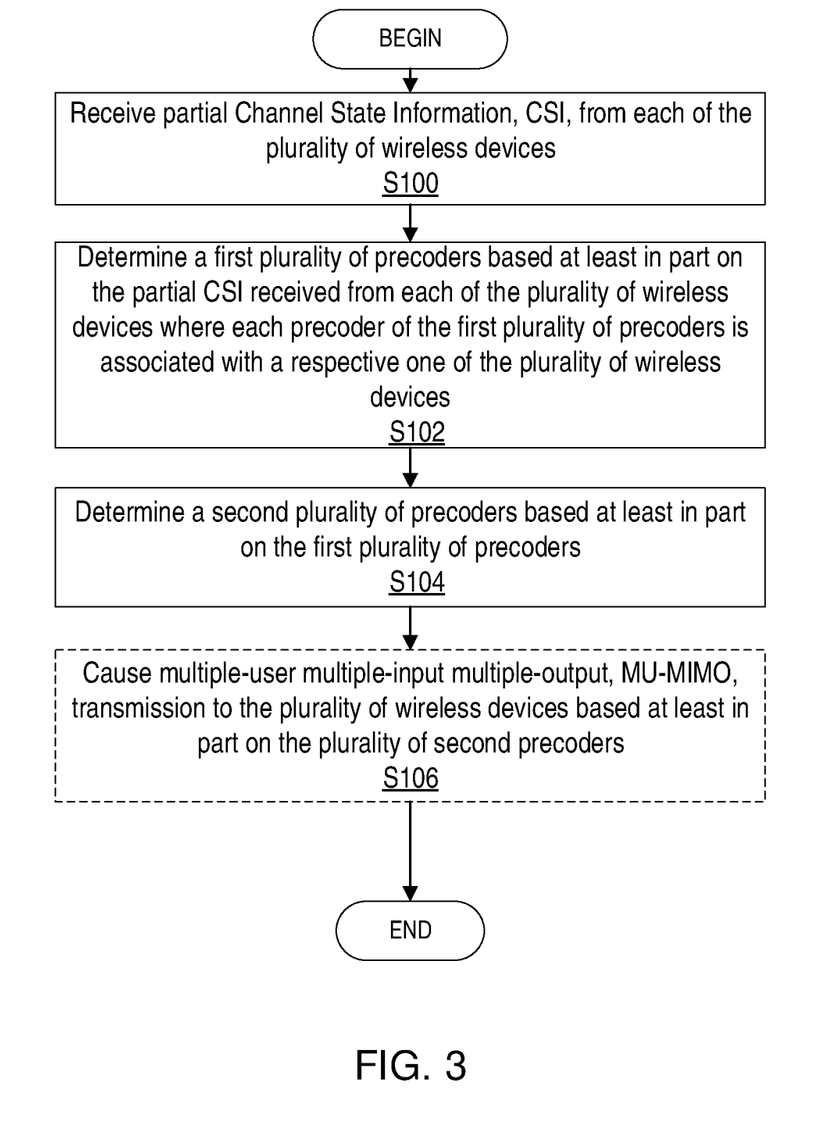
FIG. 3 is a flowchart of an exemplary process in a network node according to some embodiments of the present disclosure.

FIG. 3 is a flow diagram of a process performed by the network node 16 according to some embodiments of the disclosure such as for providing code-book based MU-MIMO transmission. One or more Blocks and/or functions performed by network node 16 may be performed by one or more elements of network node 16 such as by MIMO unit 30 in processing circuitry 38, processor 40, radio interface 36, etc. In one or more embodiments, network node 16 such as via one or more of processing circuitry 38, processor 40, MIMO unit 30, communication interface 34 and radio interface 36 is configured to receive (Block S100) partial Channel State Information, CSI, from each of the plurality of wireless devices 22, as described herein. In one or more embodiments, network node 16 such as via one or more of processing circuitry 38, processor 40, MIMO unit 30, communication interface 34 and radio interface 36 is configured to determine (Block S102) a first plurality of precoders based at least in part on the partial CSI received from each of the plurality of wireless devices 22 where each precoder of the first plurality of precoders is associated with a respective one of the plurality of wireless devices 22, as described herein.

In one or more embodiments, network node 16 such as via one or more of processing circuitry 38, processor 40, MIMO unit 30, communication interface 34 and radio interface 36 is configured to determine (Block S104) a second plurality of precoders based at least in part on the first plurality of precoders, as described herein. In one or more embodiments, network node 16 such as via one or more of processing circuitry 38, processor 40, MIMO unit 30, communication interface 34 and radio interface 36 is configured to optionally cause (Block S106) multiple-user multiple-input multiple-output, MU-MIMO, transmission to the plurality of wireless devices 22 based at least in part on the plurality of second precoders, as described herein.

According to one or more embodiments, the partial CSI corresponds to complex precoding information. According to one or more embodiments, the partial CSI corresponds to a precoding matrix indicator, PMI. According to one or more embodiments, the partial CSI corresponds to full CSI feedback for Single-User MIMO and partial CSI feedback for MU-MIMO. According to one or more embodiments, the second plurality of precoders are configured to generate more nulls in the MU-MIMO transmission when compared to using the first plurality of precoders for MU-MIMO transmission.

According to one or more embodiments, the first plurality of precoders correspond to SU-MIMO precoders. According to one or more embodiments, the determining of the second plurality of precoders for MU-MIMO transmission to the plurality of wireless devices 22 includes modifying each of the first plurality of precoders with weighting matrices. According to one or more embodiments, the processing circuitry 38 is further configured to at least one of: perform a first rank reduction on the first plurality of precoders; perform a second rank reduction on the second plurality of precoders; and the MU-MIMO transmission being based at least in part on at least one of the first rank reduction and second rank reduction. According to one or more embodiments, the second plurality of precoders are configured to generate less interference in the MU-MIMO transmission when compared to using the first plurality of precoders for MU-MIMO transmission. According to one or more embodiments, the second plurality of precoders are configured to reduce MU-MIMO transmission leakage to the plurality of wireless devices when compared to using the first plurality of precoders for MU-MIMO transmission.

According to one or more embodiments, a network node 16 configured to communicate with a plurality of wireless devices 22 is provided. The network node includes processing circuitry 38 configured to: receive partial Channel State Information, CSI, from each of the plurality of wireless devices 22; determine a plurality of single-user multiple-input multiple-output, SU-MIMO, precoders based at least in part on the partial CSI received from each of the plurality of wireless devices 22 where each SU-MIMO precoder of the plurality of SU-MIMO precoders is associated with a respective one of the plurality of wireless devices 22; determine a plurality of multiple-user multiple-input multiple-output, MU-MIMO, precoders where the plurality of MU-MIMO precoders are based at least in part on the plurality of SU-MIMO precoders; and optionally cause MU-MIMO transmission to the plurality of wireless devices 22 based at least in part on the plurality of MU-MIMO precoders.

Having described the general process flow of arrangements of the disclosure and having provided examples of hardware and software arrangements for implementing the processes and functions of the disclosure, the sections below provide details and examples of arrangements for MU-MIMO transmission based at least in part on minimal and/or partial channel state information.

Embodiments provide MU-MIMO transmission based at least in part on minimal and/or partial channels state information.

In one or more embodiments, it is assumed that a network node 16 has M transmit ports and serves U wireless devices 16 (WD 22) with WD-i capable of receiving up to $L_i$ layers. Let $W_i$, i=0, . . . , U−1 denote the M×$L_i$ precoder matrices that WD-i provides as a feedback to network node 16. In some wireless communication standards such as 3GPP NR, this precoder is represented by {$i_{11}$, $i_{12}$, $i_{13}$, $i_2$, RI} where {$i_{11}$, $i_{12}$} indicates a wide-band direction for even layers, $i_{13}$ may be used for indicating the directions for odd layers in case of rank indicator 5>(RI)>1 transmission. Other ways representing the precoder are equally applicable to the teachings described herein such that the only requirement for the MU-MIMO approach described herein may be that the feedback made available to the network node 16 should allow the network node 16 to evaluate the desired beamformers for each layer and for each wireless device 22, as described herein.

In general, the precoder $W_i$ is useful for WD-i and does not necessarily result in low interference to other wireless devices 22. In order to simultaneously transmit to multiple wireless devices 22, the directions indicated by the precoder feedback may need to be utilized at the same time such as to minimize the leakage to WD-j, j≠i. The total number of layers supported for MU-MIMO transmission may be assumed to be $L_{max}$≤M. Let the subset of K wireless devices 22 that may be served in a single MU-MIMO transmission be denoted by $\psi$={$i_0$, . . . , $i_{K-1}$} such that $\Sigma_{k=0}^{K-1} L_{i_k}=L_T \leq L_{max}$. Selection of such K wireless devices 22 satisfying the rank constraints (e.g., hardware limitations, scheduler limitations, system constraints, etc.) where the specific rank constraints are beyond scope of this disclosure. It is contemplated that any scheduling method can be used to select the wireless devices 22 in set $\psi$.

For each WD-$i_k$ in $\psi$, let $P_{i_k}=\Sigma_{j=0}^{K-1} W_{i_j} X_{i_j,i_k}$ denote the precoder modified for MU-MIMO transmission to WD-s, $i_0$, . . . , $i_{K-1}$. One aspect is to maximize the correlation between $P_{i_k}$ with $W_{i_k}$ while at the same time minimizing the correlation with $W_{i_j}$, j≠k. This aspect may be performed at least in part by determining weighting matrices $X_{i_j,i_k}$ that transform the $W_{i_k}$ such that its null space contains $W_{i_j}$, j≠k, ∀j. In one or more embodiments, this problem can be solved by applying Zero-forcing precoding in the precoder domain. To that end, let Z=[$W_{i_0}$ . . . $W_{i_{K-1}}$] denote the M×$L_T$ composite precoder matrix. Let the pseudo inverse of $Z^\dagger=(Z^H Z)^{-1}$. The modified precoders for MU-MIMO transmission are obtained as $$P_{i_k} = Z(Z^H Z)^{-1} E_{i_k}$$
$$= ZZ^\dagger E_{i_k}$$

where $$E_{i_k} = \begin{bmatrix} 0 & \ldots & I_{L_{i_k}} & \ldots & 0 \end{bmatrix}^T$$

is a $L_T \times L_{i_k}$ indicator matrix of K blocks where the kth block is an identity matrix of size $L_{i_k} \times L_{i_k}$ and all other entries are 0 s. Imagining $Z^\dagger$ as a block matrix, $X_{i_j,i_k}$ becomes the building blocks of this pseudoinverse. Note that the resulting modified precoder for each WD-$i_k$ creates a modified beam such that the main signal strength still utilizes the direction achieved by the feedback precoder $W_{i_k}$ while at the same time creating nulls at the directions of other users in $\psi$, thereby helping reduce, minimize and/or avoid interference to other wireless devices 22 in the MU-MIMO group (i.e., group of wireless devices 22 involved in MU-MIMO transmission with the network node 16). Further, one or more embodiments described herein advantageously increases the freedom to create one or more nulls in one or more directions at least when compared to existing systems.

In one or more embodiments, dynamic rank allocation and overriding are enabled. For example, by inspecting the orthogonality of precoder columns among the wireless devices 22, rank reduction can be applied to a desired set of wireless device 22 in case of wireless device 22 pairing such that the total capacity for MU-MIMO may be increased or boosted as compared to MU-MIMO transmission without such dynamic rank allocation. This approach results in a composite precoder matrix Z which results in superior modified $P_{i_k}$ for each wireless device 22 since the zero-forcing precoder approach, as described in one or more embodiments herein, may require only a slight direction deviation from the original precoders.

In addition and/or as an alternative to pre-zero-forced rank allocation, post-zero-forced rank allocation may be applied. In post-zero forced rank allocation, the non-zero entries of the identity matrix $$I_{L_{i_k}}$$

are selectively zeroed out, which results in a $P_{i_k}$ with a smaller number of columns than $L_{i_k}$. For example, the columns having the largest correlation with the original precoder $W_{i_k}$ columns may be selected. This post-zero force rank allocation may help ensure that the MU-MIMO transmission is performed in the strongest directions desirable for the wireless devices 22 being served.

Figure 4:
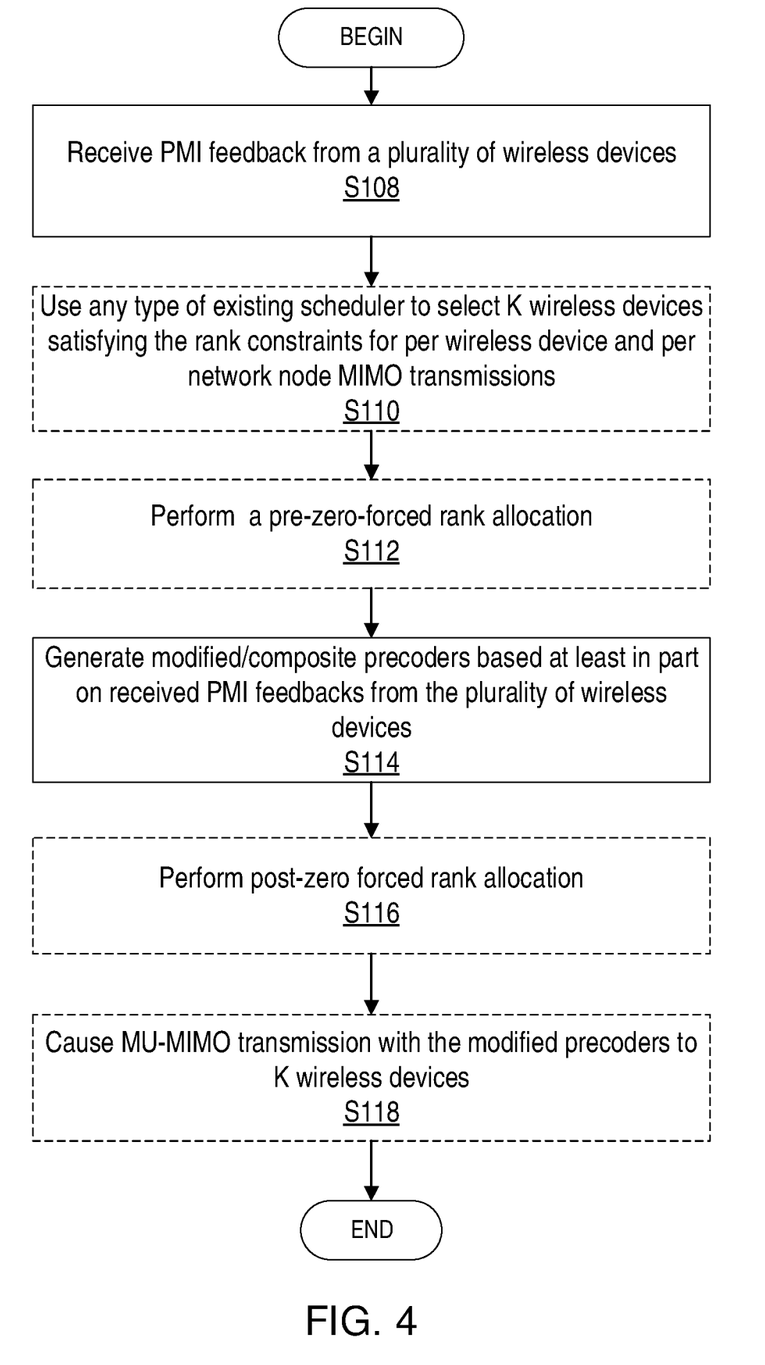
FIG. 4 is a flowchart of an exemplary process in a network node according to some embodiments of the present disclosure.

FIG. 4 is a flow diagram of a process performed by the network node 16 according to some embodiments of the disclosure such as for providing code-book based MU-MIMO transmission. One or more Blocks and/or functions performed by network node 16 may be performed by one or more elements of network node 16 such as by MIMO unit 30 in processing circuitry 38, processor 40, radio interface 36, etc. In one or more embodiments, network node 16 such as via one or more of processing circuitry 38, processor 40, MIMO unit 30, communication interface 34 and radio interface 36 is configured to receive (Block S108) PMI feedback from a plurality of wireless devices 22, as described herein.

In one or more embodiments, network node 16 such as via one or more of processing circuitry 38, processor 40, MIMO unit 30, communication interface 34 and radio interface 36 is configured to generate (Block S110) a composite precoder such as for MU-MIMO transmission based at least in part on the received PMI feedback (e.g., partial CSI or partial CSI feedback) from the plurality of wireless devices 22, as described herein.

In one or more embodiments, network node 16 such as via one or more of processing circuitry 38, processor 40, MIMO unit 30, communication interface 34 and radio interface 36 is configured to optionally use (Block S110) any type of existing scheduler to select K wireless devices 22 satisfying the rank constraints for per wireless device 22 and per network node 16 MIMO transmissions, as described herein. In one or more embodiments, network node 16 such as via one or more of processing circuitry 38, processor 40, MIMO unit 30, communication interface 34 and radio interface 36 is configured to optionally perform (Block S112) a pre-zero-forced rank allocation, as described herein.

In one or more embodiments, network node 16 such as via one or more of processing circuitry 38, processor 40, MIMO unit 30, communication interface 34 and radio interface 36 is configured to generate (Block S114) modified/composite precoders based at least in part on received PMI feedbacks from the plurality of wireless devices 22, as described herein. In particular, the modified/composite precoders have the desirable features of: (1) creating beams in the desired directions for serving the plurality of wireless devices 22 and (2) helping reduce interference by creating or nulls at and/or in the directions towards the desired directions of at least some of the other K–1 wireless devices 22. In one or more embodiments, network node 16 such as via one or more of processing circuitry 38, processor 40, MIMO unit 30, communication interface 34 and radio interface 36 is configured to optionally perform (Block S116) post-zero forced rank allocation, as described herein. For example, post-processed precoders can use rank-reduction if needed or desired. Note, pre- and post-processed rank allocations can be performed independently of each other or may be completely omitted. In one or more embodiments, feedback rank values provided by the wireless devices 22 can be overwritten based on channel quality indicators and spatial separation among beams provided by the wireless devices 22. The transmitter or network node 16 may reduce the rank of some wireless devices 22 with less favorable channel reception qualities based on the channel quality indicator feedback, and/or precoder feedbacks indicating a smaller beam separation, and/or WDs with lower priorities. In other words, the rank of a wireless device 22 may be reduced if needed for serving multiple wireless devices 22 such that depending on the spatial separation of interlayers and associated signal quality for a wireless device 22, the network node 16S may reduce one or more layers for the wireless device 22 to allow for transmission to other wireless devices 22 with more favorable channel conditions. In one or more embodiments, network node 16 such as via one or more of processing circuitry 38, processor 40, MIMO unit 30, communication interface 34 and radio interface 36 is configured to optionally cause MU-MIMO transmission (Block S118) with the modified/composite precoders to K wireless devices 22 (i.e., a plurality of wireless devices 22), as described herein.

Therefore, in one or more embodiments, a low-complexity and low-overhead method is provided where the method may utilize minimal or partial channel state information to benefit MU-MIMO transmissions. For example, in one or more embodiments, the network node 16 may only need to use precoder indices feedback from wireless devices 22. Based on the feedback, the network node 16 may calculate a zero-forcing like precoder using the available precoders without the need for accurate channel state information, i.e., full channel state information. One or more embodiments described herein allows also for dynamic rank allocation for paired wireless devices 22 depending on the orthogonality levels of each layer among the wireless devices 22. The developed pre- and post-processed rank allocations allow for optimizing the overall MU-MIMO performance regardless of the wireless device selection imposed by the scheduler of network node 16.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
MU-MIMO Multi-user multi-input multi-output
PMI Precoder matrix index
CSI Channel state information
CSI-RS CSI Reference signal
RI Rank indicator
UE User Equipment It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a plurality of wireless devices, the network node comprising:
processing circuitry configured to:
receive partial Channel State Information, CSI, from each of the plurality of wireless devices;
determine a first plurality of precoders based at least in part on the partial CSI received from each of the plurality of wireless devices, each precoder of the first plurality of precoders being associated with a respective one of the plurality of wireless devices;
determine a second plurality of precoders based at least in part on the first plurality of precoders;
one or both of:
perform a first rank reduction on the first plurality of precoders; and
perform a second rank reduction on the second plurality of precoders; and
cause multiple-user multiple-input multiple-output, MU-MIMO, transmission to the plurality of wireless devices based at least in part on the plurality of second precoders, the MU-MIMO transmission being based at least in part on one or both of the first rank reduction and the second rank reduction.

2. The network node of claim 1, wherein the partial CSI corresponds to complex precoding information.

3. The network node of claim 1, wherein the partial CSI corresponds to a precoding matrix indicator, PMI.

4. The network node of claim 1, wherein the partial CSI corresponds to full CSI feedback for Single-User MIMO and partial CSI feedback for MU-MIMO.

5. The network node of claim 1, wherein the second plurality of precoders are configured to generate more nulls in the MU-MIMO transmission when compared to using the first plurality of precoders for MU-MIMO transmission.

6. The network node of claim 1, wherein the first plurality of precoders correspond to SU-MIMO precoders.

7. The network node of claim 1, wherein the determining of the second plurality of precoders for MU-MIMO transmission to the plurality of wireless devices includes modifying each of the first plurality of precoders with weighting matrices.

8. The network node of claim 1, wherein the second plurality of precoders are configured to generate less interference in the MU-MIMO transmission when compared to using the first plurality of precoders for MU-MIMO transmission.

9. The network node of claim 1, wherein the second plurality of precoders are configured to reduce MU-MIMO transmission leakage to the plurality of wireless devices when compared to using the first plurality of precoders for MU-MIMO transmission.

10. A method implemented by a network node that is configured to communicate with a plurality of wireless devices, the method comprising:
receiving partial Channel State Information, CSI, from each of the plurality of wireless devices;
determining a first plurality of precoders based at least in part on the partial CSI received from each of the plurality of wireless devices, each precoder of the first plurality of precoders being associated with a respective one of the plurality of wireless devices;

determining a second plurality of precoders based at least in part on the first plurality of precoders;

one or both of:
  performing a first rank reduction on the first plurality of precoders; and
  performing a second rank reduction on the second plurality of precoders; and causing multiple-user multiple-input multiple-output, MU-MIMO, transmission to the plurality of wireless devices based at least in part on the plurality of second precoders; the MU-MIMO transmission being based at least in part on the one or both of the first rank reduction and the second rank reduction.

11. The method of claim 10, wherein the partial CSI corresponds to complex precoding information.

12. The method of claim 10, wherein the partial CSI corresponds to a precoding matrix indicator, PMI.

13. The method of claim 10, wherein the partial CSI corresponds to full CSI feedback for Single-User MIMO and partial CSI feedback for MU-MIMO.

14. The method of claim 10, wherein the second plurality of precoders are configured to generate more nulls in the MU-MIMO transmission when compared to using the first plurality of precoders for MU-MIMO transmission.

15. The method of claim 10, wherein the first plurality of precoders correspond to SU-MIMO precoders.

16. The method of claim 10, wherein the determining of the second plurality of precoders for MU-MIMO transmission to the plurality of wireless devices includes modifying each of the first plurality of precoders with weighting matrices.

17. The method of claim 10, wherein the second plurality of precoders are configured to generate less interference in the MU-MIMO transmission when compared to using the first plurality of precoders for MU-MIMO transmission.

18. The method of claim 10, wherein the second plurality of precoders are configured to reduce MU-MIMO transmission leakage to the plurality of wireless devices when compared to using the first plurality of precoders for MU-MIMO transmission.

* * * * *